United States Patent
Choi et al.

(10) Patent No.: US 8,406,545 B2
(45) Date of Patent: Mar. 26, 2013

(54) APPARATUS FOR ENCODING IMAGE AND APPARATUS FOR DECODING IMAGE

(75) Inventors: Woong-il Choi, Hwaseong-si (KR); Dae-hee Kim, Suwon-si (KR); Dae-sung Cho, Seoul (KR); Hyun-mun Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 756 days.

(21) Appl. No.: 12/289,615

(22) Filed: Oct. 30, 2008

(65) Prior Publication Data

US 2009/0226106 A1    Sep. 10, 2009

(30) Foreign Application Priority Data

Mar. 10, 2008   (KR) .................. 10-2008-0022156

(51) Int. Cl.
G06K 9/36 (2006.01)
G06T 9/40 (2006.01)
H04N 1/417 (2006.01)
H04N 1/415 (2006.01)

(52) U.S. Cl. ........ 382/238; 382/232; 382/239; 382/240; 348/394.1; 348/398.1

(58) Field of Classification Search .................. 382/238, 382/232, 239, 240; 348/394.1, 398.1
See application file for complete search history.

(56) References Cited

U.S. PATENT DOCUMENTS

| 4,821,119 | A  | * | 4/1989  | Gharavi ............... 375/240.16 |
| 5,006,931 | A  | * | 4/1991  | Shirota ................ 375/240.2 |
| 5,253,055 | A  | * | 10/1993 | Civanlar et al. ........ 375/240.24 |
| 5,748,244 | A  | * | 5/1998  | Jung .................. 375/240.18 |
| 7,865,027 | B2 | * | 1/2011  | Kim ........................ 382/240 |
| 8,050,329 | B2 | * | 11/2011 | Li ..................... 375/240.26 |
| 2007/0122046 | A1 | * | 5/2007 | Cai et al. ................. 382/239 |
| 2007/0223579 | A1 | * | 9/2007 | Bao ................... 375/240.12 |
| 2009/0097568 | A1 | * | 4/2009 | Karczewicz et al. .... 375/240.24 |

OTHER PUBLICATIONS

Wiegand, et al. "Entropy-Constrained Design of Quadtree Video Coding Schemes." IPA97, Conference Publication. 443. (1997): 36-40. Print.*

* cited by examiner

*Primary Examiner* — Michael A Newman
(74) *Attorney, Agent, or Firm* — Staas & Halsey LLP

(57) ABSTRACT

Provided are an apparatus for encoding an image and an apparatus for decoding an image. The apparatus for encoding the image includes a grouping unit to group transform coefficients according to layers and generate groups, a pattern encoding unit to generate and encode the pattern information of each group by using the quantized transform coefficients existing in the groups of each layer in an order from an upper layer to a lower layer, and a level encoding unit to encode levels of the quantized transform coefficients corresponding to the pattern information of the groups of each layer and generate bitstreams along with the pattern information of the groups of each layer.

20 Claims, 5 Drawing Sheets

FIG. 3B

| L2[0] | L2[1] | L2[4] | L2[5] |
| --- | --- | --- | --- |
| L2[2] | L2[3] | L2[6] | L2[7] |
| L2[8] | L2[9] | L2[12] | L2[13] |
| L2[10] | L2[11] | L2[14] | L2[15] |

FIG. 3C

| L1[0] | L1[2] | L1[16] | L1[18] | L1[32] | L1[34] | L1[48] | L1[50] |
|---|---|---|---|---|---|---|---|
| L1[1] | L1[3] | L1[17] | L1[19] | L1[33] | L1[35] | L1[49] | L1[51] |
| L1[4] | L1[6] | L1[20] | L1[22] | L1[36] | L1[38] | L1[52] | L1[54] |
| L1[5] | L1[7] | L1[21] | L1[23] | L1[37] | L1[39] | L1[53] | L1[55] |
| L1[8] | L1[10] | L1[24] | L1[26] | L1[40] | L1[42] | L1[56] | L1[58] |
| L1[9] | L1[11] | L1[25] | L1[27] | L1[41] | L1[43] | L1[57] | L1[59] |
| L1[12] | L1[14] | L1[28] | L1[30] | L1[44] | L1[46] | L1[60] | L1[62] |
| L1[13] | L1[15] | L1[29] | L1[31] | L1[45] | L1[47] | L1[61] | L1[53] |

APPARATUS FOR ENCODING IMAGE AND APPARATUS FOR DECODING IMAGE

CROSS-REFERENCE TO RELATED APPLICATIONS

This application claims the benefit of Korean Patent Application No. 10-2008-0022156, filed on Mar. 10, 2008, in the Korean Intellectual Property Office, the disclosure of which is incorporated herein in its entirety by reference.

BACKGROUND

1. Field

One or more embodiments of the present invention relate to image encoding and decoding, and more particularly, to an apparatus for encoding an image by using multi-layer entropy encoding and an apparatus for decoding an image.

2. Description of the Related Art

In general, a still image or a moving image is encoded by performing entropy encoding on quantized coefficients. Entropy encoding involves scanning quantized coefficients of a predetermined unit, for example, a frame, in a zigzag pattern, performing run length encoding to generate run length symbols, and mapping the run length symbols to codewords by performing variable length coding to form bitstreams. Such entropy encoding is based on the fact that quantized coefficients are mostly located in a region corresponding to low frequency components and most coefficients after quantization become zero. That is, a scanning pattern is determined by considering the distribution of the quantized coefficients, and run length encoding is performed to efficiently encode the coefficients that become zero (0) after quantization. However, when the quantized coefficients are obtained from residue data generated from results of predictive encoding, the distribution of the quantized coefficients is changed, such that, instead of being mostly located in a region corresponding to low frequency components, the coefficients may tend to be uniformly distributed in both regions corresponding to low and high frequency components. That is, since the residue data obtained through the predictive encoding does not include information on distribution characteristics with respect to frequency components which are considered in entropy encoding, it is difficult to achieve a desired compression rate through the entropy encoding.

SUMMARY

One or more embodiments of the present invention provide an apparatus for encoding an image using multi-layer entropy encoding and an apparatus for decoding an image.

Additional aspects and/or advantages will be set forth in part in the description which follows and, in part, will be apparent from the description, or may be learned by practice of the invention.

To achieve the above and/or other aspects and advantages, one or more embodiments of the present invention may include an entropy encoding unit including a grouping unit to group transform coefficients according to the layers and generate groups, a pattern encoding unit to generate and encode the pattern information of each group by using the quantized transform coefficients existing in the groups of each layer in an order from an upper layer to a lower layer, and a level encoding unit to encode levels of the quantized transform coefficients corresponding to the pattern information of the groups of each layer and generate bitstreams along with the pattern information of the groups of each layer.

The entropy decoding unit may include a grouping unit to store groups corresponding to each layer, a pattern decoding unit to decode the pattern information of each layer by applying groups of each layer to the bitstreams in an order from an upper layer to a lower layer, and a level decoding unit decoding the levels corresponding to the pattern information of each layer.

To achieve the above and/or other aspects and advantages, one or more embodiments of the present invention may include an apparatus for encoding an image, the apparatus including a predictive encoding unit to perform spatio-temporal predictive encoding on an input image and generate residue data, a transform unit to transform the residue data and generate transform coefficients, a quantization unit to quantize the transform coefficients, and an entropy encoding unit to apply groups defined with respect to at least one layer to the quantized transform coefficients, encode pattern information of each group generated according to the quantized transform coefficients included in groups of each layer, and encode levels of the quantized transform coefficients corresponding to the pattern information of the groups of each group.

To achieve the above and/or other aspects and advantages, one or more embodiments of the present invention may include an apparatus for decoding an image, the apparatus including an entropy decoding unit to decode pattern information of each layer from bitstreams, decode levels included in each layer corresponding to the decoded pattern information of each layer, and restore quantized transform coefficients, an inverse-quantization unit to inversely quantize the quantized transform coefficients and restore transform coefficients, an inverse-transform unit to inversely transform the transform coefficients and restore residue data, and a predictive decoding unit to perform spatio-temporal decoding on the residue data and generate a restored image.

To achieve the above and/or other aspects and advantages, one or more embodiments of the present invention may include an entropy decoding method, the method including dividing an 8×8 block which is an upper layer into a plurality of first groups in a vertical direction and decoding pattern information of the first groups in an ascending order of group indexes, dividing each of the first groups in a horizontal direction into a plurality of second groups of an intermediate layer, and decoding pattern information of the second groups in an ascending order of group indexes, and dividing each of the second groups in vertical and horizontal directions into a plurality of third groups of a lower layer, and decoding pattern information of the third groups in an N-like order, wherein the 8×8 block is provided from field type bitstreams.

BRIEF DESCRIPTION OF THE DRAWINGS

These and/or other aspects and advantages will become apparent and more readily appreciated from the following description of the embodiments, taken in conjunction with the accompanying drawings of which:

FIGS. 3A through 3C are views for explaining a method of grouping layers which is performed in grouping units of FIGS. 1 and 2 according to an embodiment of the present invention;

DETAILED DESCRIPTION OF EMBODIMENTS

Figure 1:
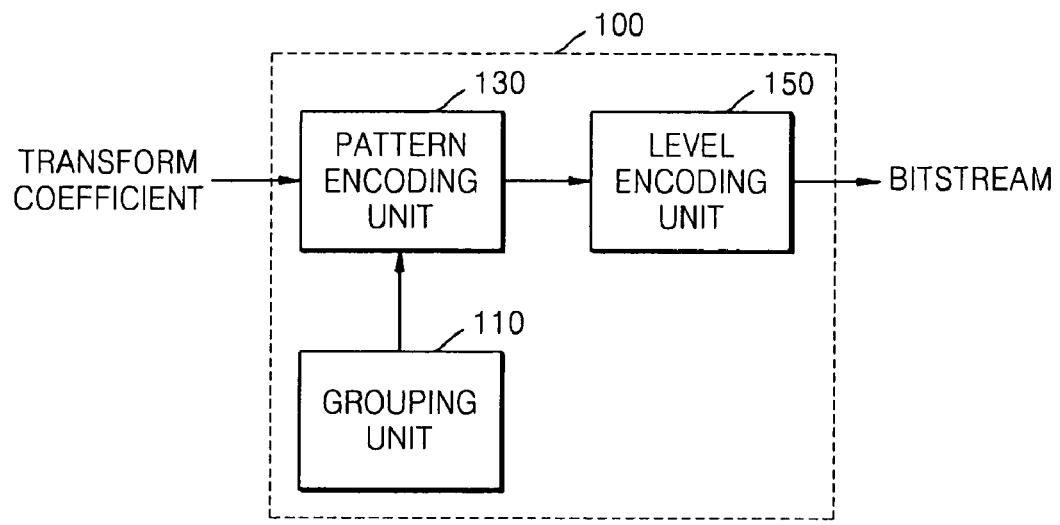
FIG. 1 is a block diagram of an entropy encoding apparatus according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram of an entropy encoding apparatus 100 according to an embodiment of the present invention. The entropy encoding apparatus 100 includes a grouping unit 110, a pattern encoding unit 130, and a level encoding unit 150. Each of the grouping unit 110, the pattern encoding unit 130, and the level encoding unit 150 may be implemented as at least one processor.

Referring to FIG. 1, the grouping unit 110 forms a plurality of layers according to an input image to be encoded, and more specifically, according to characteristics of transform coefficients of an M×N block, and generates groups according to the layers. Information on groups of each layer may be previously stored in the grouping unit 110, provided to the grouping unit 110 at the same time as the transform coefficients are input to the pattern encoding unit 130, or adaptively determined according to the size and type of the M×N block.

Groups of each layer will be explained first. Quantized transform coefficients in the M×N block are classified and included in groups which are defined according to layers. Since each transform coefficient is included in a unique group, different groups do not include the same transform coefficient. Transform coefficient groups in an upper layer are divided into lower groups in a lower layer until the groups are no longer divided, that is, until each group includes one transform coefficient. Accordingly, each group in a lowermost layer includes only one transform coefficient.

Information on the groups of each layer includes information on positions of the transform coefficients in the block. A method of grouping the layers may be determined by the type of input image. Here, the type of input image may be a frame picture or a field picture. Accordingly, in this case, the transform coefficients according to the layers are determined depending on the type of input image.

The pattern encoding unit 130 classifies pattern information of quantized transform coefficients in the transform coefficient groups of each layer provided from the grouping unit 110 and encodes the classified pattern information. The pattern information of the quantized transform coefficients in the groups may be classified according to absolute values, i.e., levels, of the transform coefficients in the groups, or whether transform coefficients other than '0' exist in the groups. Assuming that the pattern information is defined depending on whether there exist transform coefficients other than '0', when all transform coefficients are '0', pattern information may be mapped to '0', and when there exist one or more transform coefficients other than '0', pattern information of a corresponding group may be mapped to '1'.

Pattern information of groups of an upper layer is used to encode pattern information of a lower layer. For example, when pattern information of a specific group of an upper layer is '0', since pattern information of groups of a lower layer which correspond to the specific group becomes automatically '0', there is no need to encode the pattern information of the groups of the lower layer corresponding to the specific group. This is because since the fact that the pattern information of the specific group is '0' means that all transform coefficients constituting the specific group are '0', all transform coefficients of the lower groups of the lower layer which are included in the specific group are '0'.

An order of encoding pattern information of groups of each layer may be previously stored in the pattern encoding unit 130 like the grouping unit 110, may be determined by receiving information from the grouping unit 110, or may be determined from image encoding information. The image encoding information may include information on the type of input image, such as a frame picture or a field picture. Encoding of pattern information is basically performed in an order from an upper layer to a lower layer.

The level encoding unit 150 encodes the conversion coefficients corresponding to the encoded pattern information provided by the pattern encoding unit 130. For example, when pattern information of a group in an arbitrary layer is '0', since the corresponding group does not include transform coefficients other than '0', only encoded pattern information is included in bitstreams without a need to encode symbols. On the other hand, when pattern information of a group in a lowermost layer is not '0', symbol encoding and level encoding are performed on corresponding transform coefficients. If the pattern information is defined as absolute values of transform coefficients, in the case of a group having pattern information '1', encoding is performed on symbols of corresponding transform coefficients, and in the case of a group having pattern information '2', encoding is performed on levels including symbols of corresponding conversion coefficients, and then the encoded values are included in bitstreams along with the encoded pattern information in each layer. An order of encoding levels of transform coefficients is the same as the order of encoding the pattern information of each group corresponding to the lowermost layer.

Alternatively, there may be a plurality of methods of grouping layers, and one of the grouping methods may be selected and used. For example, all available groups according to layers may be stored in the grouping unit 110, or a plurality of grouping units 110 as shown in FIG. 1 may be used and one of the grouping units 110 may be selected and used in units of an M×N block or a picture. Alternatively, layers may be grouped according to the distribution of conversion coefficients in an M×N block, or may be grouped by using a grouping method that has a high performance in terms of a bitstream compression rate during pattern and level encoding. Alternatively, layers may be grouped according to the type of input image. Information of the selected groups of each layer may be included and transmitted in bitstreams in units of an M×N block or a picture.

Figure 2:
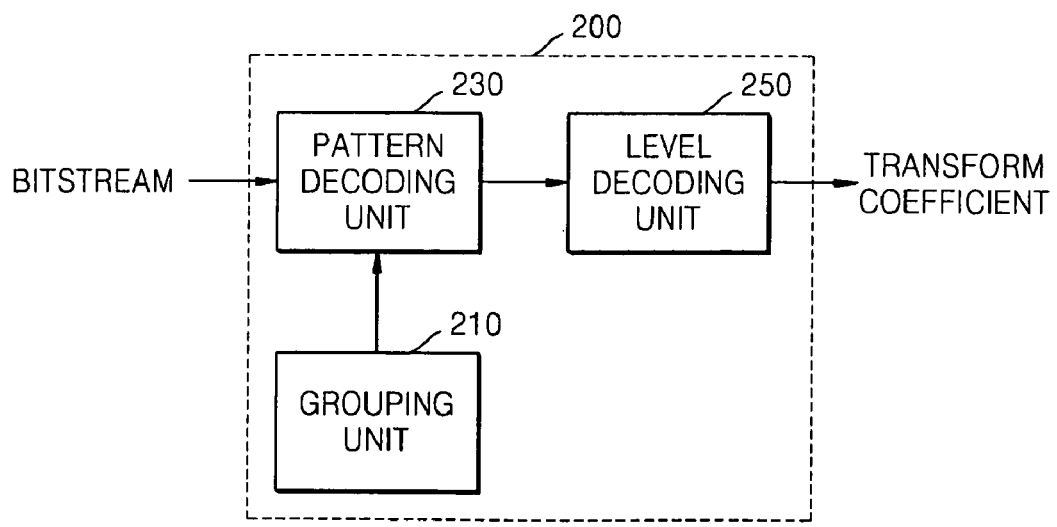
FIG. 2 is a block diagram of an entropy decoding apparatus according to an embodiment of the present invention.

FIG. 2 is a block diagram of an entropy decoding apparatus 200 according to an embodiment of the present invention. The entropy decoding apparatus 200 includes a grouping unit 210, a pattern decoding unit 230, and a level decoding unit 250. Each of the grouping unit 210, the pattern decoding unit 230, and the level decoding unit 250 may be implemented as at least one processor.

Referring to FIG. 2, the grouping unit 210 stores groups corresponding to each layer. The groups of each layer stored in the grouping unit 210 are the same as those stored in the grouping unit 110 of FIG. 1.

The pattern decoding unit 230 decodes pattern information of each layer by applying the groups of each layer to bitstreams in an order from an upper layer to a lower layer.

The level decoding unit 250 decodes levels corresponding to the decoded pattern information of the groups of each layer and restores quantized transform coefficients in units of an M×N block.

The entropy encoding apparatus and the entropy decoding apparatus of FIGS. 1 and 2 can improve a compression rate in encoding and decoding a still image or a moving image by using predictive coding. Also, when symbol encoding is performed on a layer by layer basis during entropy encoding, a smaller number of symbols are required to be processed as compared to entropy encoding employing run length encoding, thereby reducing complexity.

Figure 3A:
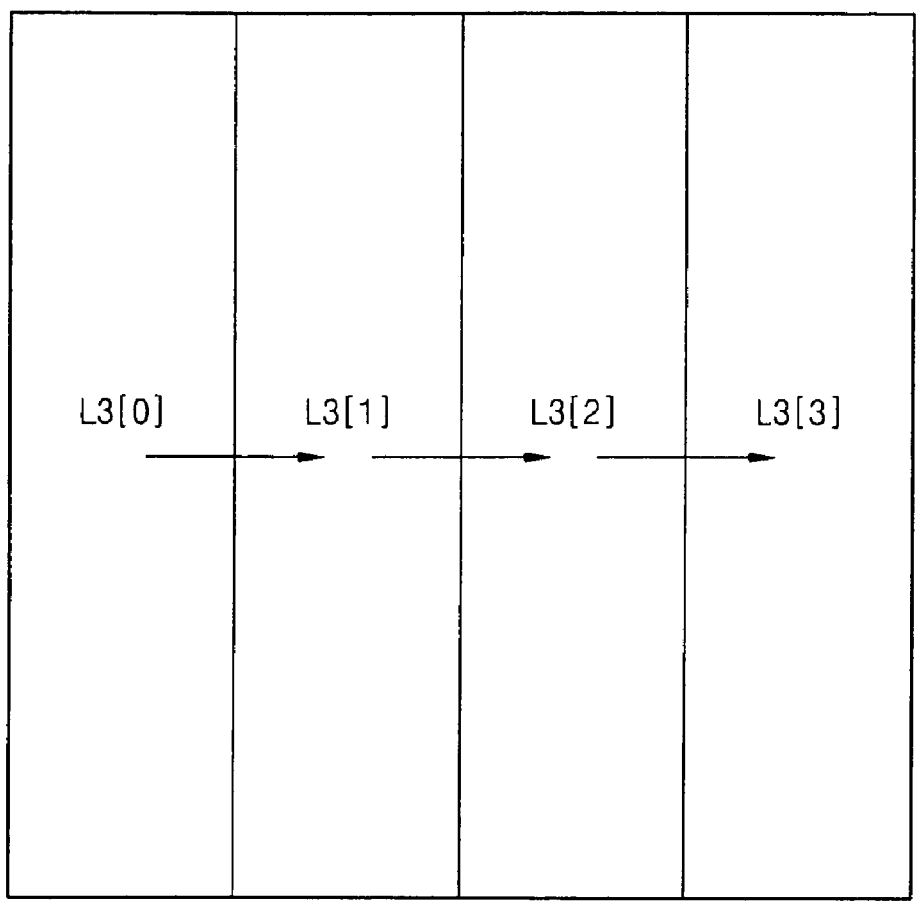

FIGS. 3A through 3C are views for explaining a method of grouping layers which is performed in the grouping units 110 and 210 of FIGS. 1 and 2 according to an embodiment of the present invention. In FIGS. 3A through 3C, an M×N block is an 8×8 block and three layers are present. First, a third layer, which is an uppermost layer, is formed by dividing the 8×8 block into a plurality of first groups, e.g., 4 2×8 blocks, in a vertical direction as shown in FIG. 3A. Next, a second layer, which is an intermediate layer, is formed by dividing each of the first groups into a plurality of second groups, e.g., 16 2×2 blocks, in a horizontal direction as shown in FIG. 3B. A first layer, which is a lowermost layer, is formed by dividing each of the second groups, e.g., 64 1×1 blocks, in horizontal and vertical directions as shown in FIG. 3C. Here, the M×N block is not limited to the 8×8 block, and may be a 32×32 block, a 32×16 block, a 16×32 block, a 16×16 block, a 16×8 block, an 8×16 block, a 4×4 block, or others, and the number and shapes of the layers are not limited thereto and may be modified in various ways. The size of the first groups obtained by dividing the 8×8 block, the size of the second groups obtained by dividing the first groups, and the size of the third groups obtained by dividing the second groups are not limited to the above embodiment. In FIGS. 3A through 3C, arrow directions, that is, a horizontal direction in FIG. 3A, a vertical direction in FIG. 3B, and an "N" direction in FIG. 3C, denote orders in which encoding is performed.

In FIGS. 3A through 3C, symbols $Lx[i]$ corresponding to respective groups represent pattern information. For example, symbols $L3[i]$ comprise pattern information of groups [i] of the third layer that is the uppermost layer. The grouping units 110 and 210 generate each layer including groups as shown in FIGS. 3A through 3C. The pattern encoding unit 130 encodes pattern information of each layer in an order from the upper layer as shown in FIG. 3A, to the intermediate layer as shown in FIG. 3B, to the lower layer as shown in FIG. 3C. The pattern information is basically encoded in an order from the pattern information $L3[i]$, to the pattern information $L2[i]$ of the second layer, to the pattern information $L1[i]$ of the first layer. In each layer, encoding is performed in arrow directions, that is, in an ascending order of indexes i. For example, the symbols $L3[i]$ of the third layer are encoded in an order of $L3[0]$, $L3[1]$, $L3[2]$, and $L3[3]$, and the symbols $L2[i]$ of the second layer and the symbols $L1[i]$ of the first layer are encoded in the same way. Here, pattern information of an upper layer is used to encode pattern information of a lower layer. For example, when the pattern information $L3[0]$ among the groups of the first layer is '0', it can be derived that all the other pattern information $L2[0]$, $L2[1]$, $L2[2]$, and $L2[3]$ is also '0'. Accordingly, there is no need to additionally encode the pattern information $L2[0]$, $L2[1]$, $L2[2]$, and $L2[3]$ of the second layer which are included in the pattern information $L3[0]$. This is because the fact that pattern information is '0' means that all transform coefficients within a corresponding group are '0'. In this same manner, pattern information of each layer is sequentially encoded. In order to encode pattern information, various encoding methods including Huffman encoding or arithmetic encoding may be used.

Figure 4:
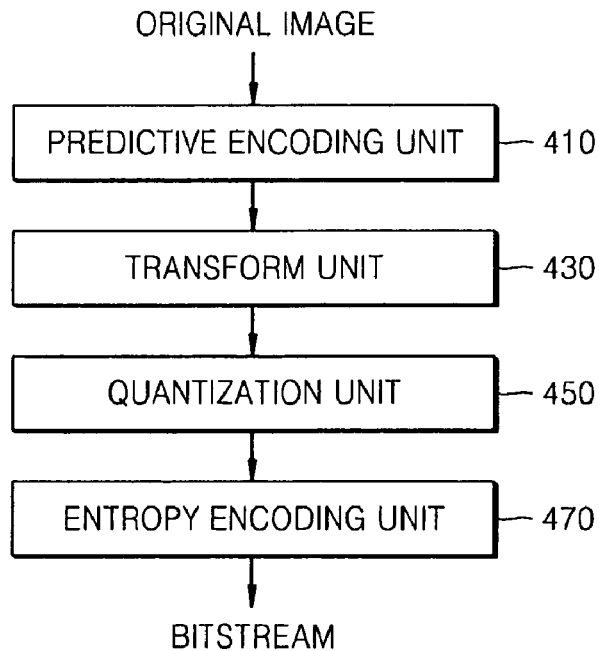
FIG. 4 is a block diagram of an image encoding apparatus to which an entropy encoding apparatus is applied according to an embodiment of the present invention.

FIG. 4 is a block diagram of an image encoding apparatus to which an entropy encoding apparatus is applied according to an embodiment of the present invention. The apparatus for encoding the image includes a predictive encoding unit 410, a transform unit 430, a quantization unit 450, and an entropy encoding unit 470. Each of the predictive encoding unit 410, the transform unit 430, the quantization unit 450, and the entropy encoding unit 470 may be implemented as at least one processor.

Referring to FIG. 4, the predictive encoding unit 410 performs spatio-temporal predictive encoding on an input image to generate residue data.

The transform unit 430 transforms the residue data and generates transform coefficients. The transform unit 430 may perform discrete cosine transformation. The quantization unit 450 quantizes the transform coefficients.

The entropy encoding unit 470 applies groups defined with respect to at least one layer to the quantized transform coefficients, encodes pattern information of each layer generated according to the quantized transform coefficients included in the groups of each layer, and encodes levels of the quantized transform coefficients corresponding to the pattern information of each layer.

Figure 5:
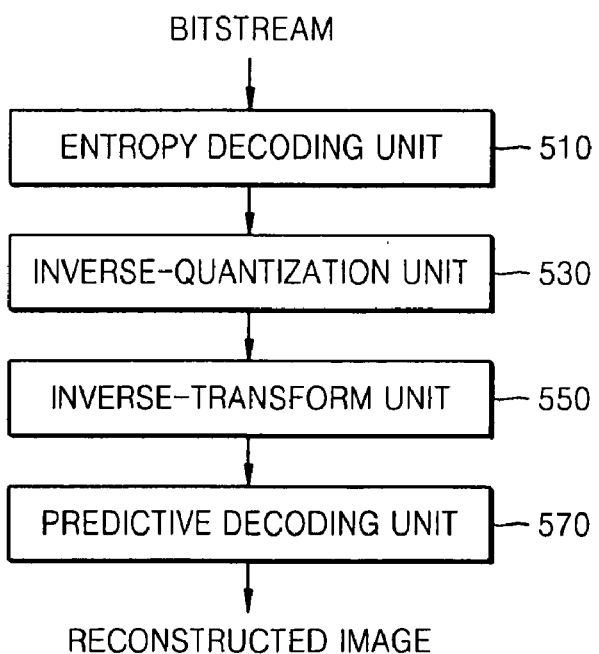
FIG. 5 is a block diagram of an image decoding apparatus to which an entropy decoding apparatus is applied according to an embodiment of the present invention

FIG. 5 is a block diagram of an image decoding apparatus to which an entropy decoding apparatus is applied according to an embodiment of the present invention. The apparatus for decoding the image includes an entropy decoding unit 510, an inverse-quantization unit 530, an inverse-transform unit 550, and a predictive decoding unit 570. Each of the entropy decoding unit 510, the inverse-quantization unit 530, the inverse-transform unit 550, and the predictive decoding unit 570 may be implemented as at least one processor.

Referring to FIG. 5, the entropy decoding unit 510 decodes pattern information of each layer from bitstreams, decodes levels included in each layer corresponding to the decoded pattern information of each layer, and restores quantized transform coefficients.

The inverse-quantization unit 530 inversely quantizes the quantized transform coefficients and restores transform coefficients. The inverse-transform unit 550 inversely transforms the transform coefficients and restores residue data. The inverse-transform unit 550 may perform discrete cosine transformation like the transform unit 430.

The predictive decoding unit 570 performs spatio-temporal predictive decoding on the reside data and generates a restored image.

The apparatus for encoding the image and the apparatus for decoding the image respectively shown in FIGS. 4 and 5, excluding the entropy encoding unit 470 and the entropy decoding unit 510, may be general image codecs employing motion compensation, such as H.264, MPEG-2, and MPEG-4.

In addition to the above described embodiments, embodiments of the present invention can also be implemented through computer readable code/instructions in/on a medium, e.g., a computer readable medium, to control at least one processing element to implement any of the above described embodiments.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), for example. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although only a few embodiments have been shown and described, it would be appreciated by those of ordinary skill in the art that changes may be made in these embodiments without departing from the principles and spirit of the invention, the scope of which is defined in the claims and their equivalents.

What is claimed is:

1. An apparatus for encoding an image, the apparatus comprising:
   a predictive encoding unit to perform spatio-temporal predictive encoding on an input image and generate residue data;
   a transform unit to transform the residue data and generate transform coefficients;
   a quantization unit to quantize the transform coefficients; and
   an entropy encoding unit configured to respectively group the quantized transform coefficients into plural groups for each layer of plural layers of the quantized transform coefficients, encode pattern information of each of the plural groups of each layer generated according to the quantized transform coefficients included in the plural groups of each layer, and encode levels of the quantized transform coefficients corresponding to the pattern information of each of the plural groups of each layer.

2. The apparatus of claim 1, wherein a type of the input image is a field type.

3. The apparatus of claim 1, wherein the entropy encoding unit comprises:
   a grouping unit to group transform coefficients according to the layers and generate groups;
   a pattern encoding unit to generate and encode the pattern information of each group by using the quantized transform coefficients existing in the groups of each layer in an order from an upper layer to a lower layer; and
   a level encoding unit to encode levels of the quantized transform coefficients corresponding to the pattern information of the groups of each layer and generate bitstreams along with the pattern information of the groups of each layer.

4. The apparatus of claim 3, wherein the pattern encoding unit encodes pattern information of the lower layer by using pattern information of the upper layer.

5. The apparatus of claim 1, wherein the entropy encoding unit comprises:
   a grouping unit to set a plurality of groups with respect to transform coefficients and store the plurality of groups according to layers;
   a pattern encoding unit to select groups of each layer from among the plurality of groups and encode pattern information of the corresponding groups by using quantized transform coefficients existing in the selected groups of each layer in an order from an upper layer to a lower layer; and
   a level encoding unit to encode levels of the quantized transform coefficients corresponding to the pattern information of the selected groups of each layer and generate bitstreams along with information on the selected groups of each layer and the pattern information of the groups of each layer.

6. The apparatus of claim 5, wherein the pattern encoding unit encodes pattern information of the lower layer by using pattern information of the upper layer.

7. The apparatus of claim 5, wherein the pattern encoding unit selects the groups of each layer according to a type of the input image.

8. The apparatus of claim 5, wherein the pattern encoding unit selects the groups of each layer in units of a block including the quantized transform coefficients.

9. An entropy encoding apparatus comprising:
   a grouping unit to store plural groups corresponding to each of plural layers respectively grouping a plurality quantized transform coefficients;
   a pattern encoding unit configured to encode pattern information of each of the plural groups of each layer, by using quantized transform coefficients included in the plural groups of each layer, in an order from an upper layer to a lower layer; and
   a level encoding unit configured to encode levels of the quantized transform coefficients corresponding to the pattern information of the plural groups of each layer, and to generate bitstreams with the encoded levels of the quantized transform coefficients along with the pattern information of each of the plural groups of each layer.

10. An entropy encoding apparatus comprising:
    a grouping unit to store groups corresponding to each of plural layers respectively grouping a plurality of quantized transform coefficients;
    a pattern encoding unit to encode pattern information of the groups of each layer by using quantized transform coefficients included in the groups of each layer in an order from an upper layer to a lower layer; and
    a level encoding unit to encode levels of the quantized transform coefficients corresponding to the pattern information of the groups of each layer and generate bitstreams along with the pattern information of the groups of each layer,
    wherein the pattern encoding unit encodes pattern data of the lower layer by using pattern data of the upper layer.

11. The entropy encoding apparatus of claim 9, wherein the grouping unit includes a plurality of groups with respect to transform coefficients and stores the plurality of groups according to layers, the pattern encoding unit encodes pattern information of groups of each layer by using quantized transform coefficients in the selected groups of each layer from among the plurality of groups and includes information on the selected groups of each layer in the bitstreams.

12. The entropy encoding apparatus of claim 9, wherein a type of the input image is a field type.

13. An apparatus for decoding an image, the apparatus comprising:
    an entropy decoding unit to decode, in a layer order, pattern information of each of plural groups of each of plural layers respectively grouping quantized transform coefficients from bitstreams, decode levels of the quantized transform coefficients included in each layer corresponding to the decoded pattern information of each of the plural groups of each layer, and restore quantized transform coefficients;

an inverse-quantization unit to inversely quantize the quantized transform coefficients and restore transform coefficients;

an inverse-transform unit to inversely transform the transform coefficients and restore residue data; and a predictive decoding unit to perform spatio-temporal decoding on the residue data and generate a restored image.

14. The apparatus of claim 13, wherein a type of the input image is a field type.

15. The apparatus of claim 13, wherein the entropy decoding unit comprises:

a grouping unit to store groups corresponding to each layer;

a pattern decoding unit to decode the pattern information of each layer by applying groups of each layer to the bitstreams in an order from an upper layer to a lower layer; and a level decoding unit to decode the levels corresponding to the pattern information of each layer.

16. The apparatus of claim 15, wherein the pattern decoding unit decodes pattern information of the lower layer by using pattern information of the upper layer.

17. The apparatus of claim 13, wherein the entropy decoding unit comprises:

a grouping unit to set a plurality of groups with respect to transform coefficients and store the plurality of groups according to layers;

a pattern decoding unit to select groups of each layer from among the plurality of groups, and decode pattern information of each layer by applying the selected groups of each layer to the bitstreams in an order from an upper layer to a lower layer; and a level decoding unit decoding the levels corresponding to the pattern information of the groups of each layer.

18. The apparatus of claim 17, wherein the pattern decoding unit decodes pattern information of the lower layer by using pattern information of the upper layer.

19. The apparatus of claim 17, wherein the pattern decoding unit selects the groups of each layer according to pattern information included in the bitstreams.

20. An entropy decoding method, the method comprising:

dividing, using at least one processing device, an 8×8 block which is an upper layer into a plurality of first groups in a vertical direction and decoding pattern information of the first groups in an ascending order of group indexes;

dividing each of the first groups in a horizontal direction into a plurality of second groups of an intermediate layer, and decoding pattern information of the second groups in an ascending order of group indexes;

dividing each of the second groups in vertical and horizontal directions into a plurality of third groups of a lower layer, and respectively decoding pattern information of the third groups in a direction according to an ascending order of respective group indexes including plural vertical ascending orders and a diagonal ascending order; and decoding levels of coefficients of the 8×8 block based on the decoded pattern information of the first, second, and third groups, wherein the 8×8 block is provided from field type bitstreams.

* * * * *

UNITED STATES PATENT AND TRADEMARK OFFICE
CERTIFICATE OF CORRECTION

PATENT NO.         : 8,406,545 B2
APPLICATION NO.    : 12/289615
DATED              : March 26, 2013
INVENTOR(S)        : Woong-il Choi et al.

It is certified that error appears in the above-identified patent and that said Letters Patent is hereby corrected as shown below:

In the Claims:

Column 10, Line 13, In Claim 20, delete "8×8block" and insert -- 8×8 block --, therefor.

Signed and Sealed this
Second Day of July, 2013

Teresa Stanek Rea
*Acting Director of the United States Patent and Trademark Office*